US008639046B2

(12) United States Patent
Aggarwal

(10) Patent No.: US 8,639,046 B2
(45) Date of Patent: Jan. 28, 2014

(54) METHOD AND SYSTEM FOR SCALABLE MULTI-USER INTERACTIVE VISUALIZATION

(75) Inventor: Manoj Aggarwal, Lawrenceville, NJ (US)

(73) Assignee: Mamigo Inc, Lawrenceville, NJ (US)

( * ) Notice: Subject to any disclaimer, the term of this patent is extended or adjusted under 35 U.S.C. 154(b) by 937 days.

(21) Appl. No.: 12/773,823

(22) Filed: May 4, 2010

(65) Prior Publication Data

US 2010/0278508 A1 Nov. 4, 2010

Related U.S. Application Data

(60) Provisional application No. 61/175,328, filed on May 4, 2009.

(51) Int. Cl.
*G06K 9/36* (2006.01)

(52) U.S. Cl.
USPC .......................... 382/235; 382/232; 382/233

(58) Field of Classification Search
None
See application file for complete search history.

(56) References Cited

U.S. PATENT DOCUMENTS

| | | | |
|---|---|---|---|
| 5,359,363 A | 10/1994 | Kuban | |
| 6,075,905 A | 6/2000 | Herman | |
| 6,490,627 B1 * | 12/2002 | Kalra et al. | 709/231 |
| 7,450,165 B2 | 11/2008 | Ahiska | |
| 7,522,186 B2 | 4/2009 | Arpa | |
| 7,587,454 B2 * | 9/2009 | Shabtai et al. | 709/205 |
| 7,680,348 B2 | 3/2010 | Buckley | |
| 8,411,938 B2 * | 4/2013 | Zhang et al. | 382/162 |
| 2001/0019621 A1 * | 9/2001 | Hanna et al. | 382/107 |
| 2004/0080661 A1 * | 4/2004 | Afsenius et al. | 348/345 |
| 2004/0086186 A1 * | 5/2004 | Kyusojin et al. | 382/232 |
| 2005/0213946 A1 * | 9/2005 | Braun | 386/105 |
| 2006/0125921 A1 * | 6/2006 | Foote | 348/159 |
| 2006/0136597 A1 * | 6/2006 | Shabtai et al. | 709/231 |
| 2006/0177139 A1 * | 8/2006 | Marcellin et al. | 382/232 |
| 2006/0198542 A1 * | 9/2006 | Benjelloun Touimi et al. | 381/307 |
| 2006/0203092 A1 * | 9/2006 | Nobori et al. | 348/148 |
| 2007/0014476 A1 * | 1/2007 | Marcellin et al. | 382/232 |
| 2007/0104377 A1 * | 5/2007 | Fukui | 382/232 |
| 2007/0109409 A1 * | 5/2007 | Yea et al. | 348/153 |
| 2008/0069458 A1 * | 3/2008 | Vega-Higuera et al. | 382/232 |
| 2008/0192116 A1 * | 8/2008 | Tamir et al. | 348/157 |
| 2009/0059057 A1 * | 3/2009 | Long et al. | 348/343 |
| 2009/0169102 A1 * | 7/2009 | Zhang et al. | 382/167 |
| 2009/0262206 A1 * | 10/2009 | Park | 348/218.1 |
| 2010/0097491 A1 * | 4/2010 | Farina et al. | 348/223.1 |
| 2010/0225735 A1 * | 9/2010 | Shaffer et al. | 348/14.08 |

OTHER PUBLICATIONS

Canga et al "Image fusion in the Jpeg 2000 domain", IEEE International Conference on Multisensor Fusion and Integration for Intelligent Systems 2006.*
Burt, The Laplacian Pyramid as a Compact Image Code, IEEE Transactions on Communications, Apr. 1983.
Unser, An Improved Least Squares Laplacian Pyramid for Image Compression, Signal Processing, vol. 27, No. 2, pp. 187-203, May 1992.

* cited by examiner

*Primary Examiner* — Sean Motsinger
(74) *Attorney, Agent, or Firm* — Roy J. Rosser

(57) ABSTRACT

A scalable method and apparatus is described to provide personalized interactive visualization of a plurality of compressed image data to a plurality of concurrent users. A plurality of image sources are digitally processed in the compressed domain to provide controllable enhanced user-specific interactive visualization with support for adjustment in viewing parameters such frame-rate, field of view, resolution, color format, viewpoint and bandwidth.

22 Claims, 12 Drawing Sheets

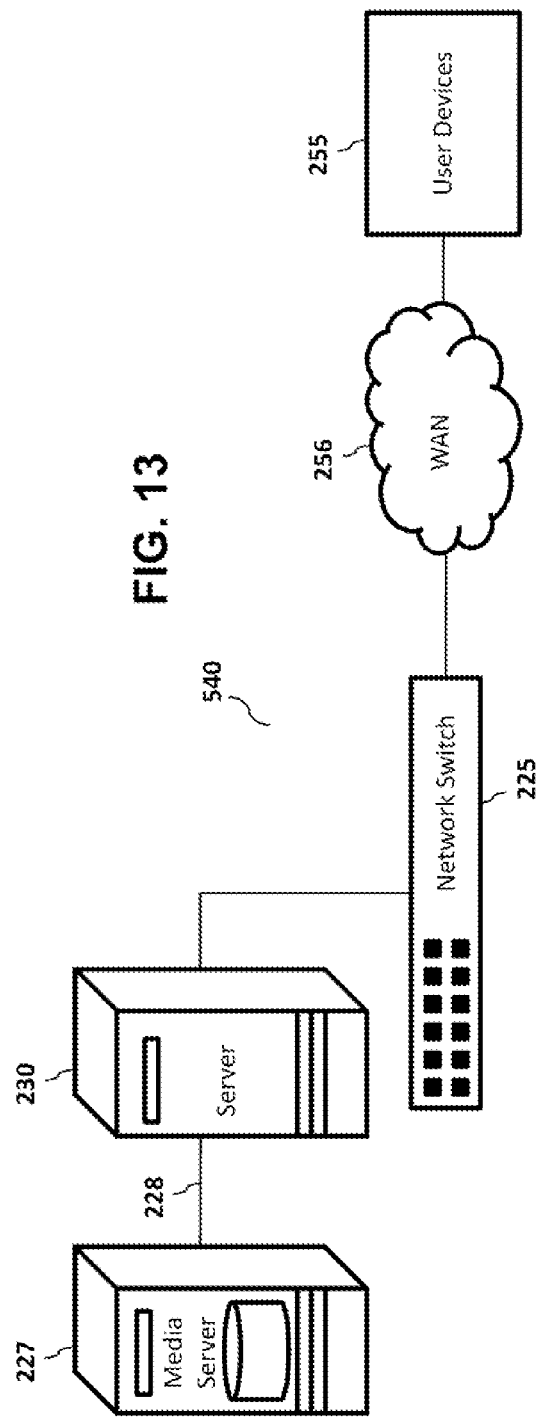

METHOD AND SYSTEM FOR SCALABLE MULTI-USER INTERACTIVE VISUALIZATION

CROSS-REFERENCE TO RELATED APPLICATIONS

This application claims benefit of U.S. provisional patent application Ser. No. 61/175,328, filed May 4, 2009 which is incorporated herein as reference.

BACKGROUND OF THE INVENTION

1. Field of Invention

The invention relates to a method and apparatus for efficiently and seamlessly synthesizing a plurality of dynamically configurable compressed views of a scene from compressed imagery of the scene captured by a plurality of video sources.

2. Description of Related Art

High resolution mega-pixel video cameras provide a cost effective way of providing high quality visual coverage of a large area of interest. To achieve detailed coverage of a large area of interest, such as a sports arena, railway station, a large facility or a building may require several such cameras possibly generating several mega-pixels of data at video-rate. Multiple users have a need to access this data with different resolutions, field of view coverage and formats.

Despite availability of such high quality, large coverage, high-resolution imagery, existing systems are limited in their ability to simultaneously synthesize multiple views that can be independently controlled to provide configurable field of view and resolution seamlessly across the covered venue. It is desirable that each user, independent of the others, be able to seamlessly navigate the covered area similar in experience to a having a Pan Tilt Zoom camera solely to itself.

For instance, multiple security guards may want to view or assess different parts of the buildings, or follow different intruders in a multi-prong intrusion. Further, a mobile guard may want to monitor the situation on a handheld device supporting CIF resolution, while a guard in the control room may monitor on a 1080 p HD display.

In a sports arena, multiple TV screens may be displaying different views of the play, as determined by the production director assigned to that display. Further, some of the legacy displays may be Standard Definition, while others may be High Definition with resolutions ranging from 720 i to 1080 p.

In an internet video conferencing scenario, multiple participants generate video at different resolutions and have different viewing resolution and bandwidth constraints. Each user may individually desire to view either all, a subset or just one of the participants on their display. Further, a smart phone user on a 3G network may have very different bandwidth and resolution constraints than a user on a high-speed internet network using a large TV display.

Traditional methods and systems for personalized interactive visualization experience are computationally prohibitive and unable to support a plurality of concurrent users with user-specific viewing requirements and constraints. The computational cost has dramatically increased especially due to high-resolution mega-pixel video sources, while maintaining need to support low resolution to high resolution displays. Traditional methods of decompressing all source video to raw format, processing raw video, synthesizing user-specific view and recompressing them is cost prohibitive and no longer sustainable when required to support high-resolution video sources and displays.

Several mega-pixel camera manufactures provide systems that support a few independent views (typically up to 4) that can be simultaneously and independently controlled for field of view and resolution. The synthesized views are, however, limited to within the field of view of each camera. The users are unable to see a view that may be partially covered by two separate cameras. The visualization is therefore not seamless; it is limited to one camera and limited to a few users.

On the other hand, several legacy video visualization system support 2D or 3D stitching of videos from multiple standard resolution cameras in a geographic reference frame to provide a seamless navigation across multiple cameras. U.S. Pat. No. 7,522,186 describes a system for overlaying imagery from multiple fixed cameras onto a 3D textured model of a scene. These systems perform computationally prohibitive full decompression followed by alignment, and view synthesis in the image domain using special graphics card for visualization. The high computational cost of these image processing steps significantly impedes their ability to synthesize plurality of views in a scalable and cost-effective way. As a result, the system is limited to synthesizing only one view, and thus supports only one user. Every additional user requires its own complete visualization system. This approach is not scalable to large number of users due to limitations of cost of each system and bandwidth requirement to transfer possibly 10's of mega-pixels of imagery to every such system at video rate.

U.S. Pat. Nos. 5,359,363 and 7,450,165 describe devices for generating user-specific views in raw image format. The devices are limited to support a single uncompressed camera source and the patent does not address scalability of processing for plurality of users, and do not support compressed video sources.

U.S. Pat. No. 6,075,905 describes a method for stitching a sequence of raw images to construct a mosaic. The patent does not address generating a user-specific view of desired resolution and field of view characteristics, and does not address scalability of processing for generating a plurality of user-specific views.

Several methods have been described in literature for manipulating imagery in the compressed domain for better performance. U.S. Pat. No. 7,680,348 and references therein describe fast compressed domain methods for adjusting video resolution and region of interest for JPEG 2000 compressed imagery. The patent and references do not address compositing video from a plurality of video sources and processing architecture for generating a plurality of user-specific views.

Consequently, there remains a need in the art for a scalable method and apparatus that supports a plurality of concurrent users and provides personalized control to each of the concurrent users for interactive visualization across a plurality of video sources with support for output user-specific resolutions and bandwidth constraints.

BRIEF SUMMARY OF THE INVENTION

The present invention teaches systems and methods to efficiently synthesize plurality of dynamically configurable views of a scene in compressed domain from at least one compressed video or image sources; wherein each configurable view may be specified by at least one of the following view synthesis parameters: field of view, viewpoint, resolution, color format, frame rate and bandwidth.

One aspect of the present invention provides improved methods to leverage multi-resolution data extractable from multi-scale image compression formats with minimal processing to synthesize plurality of views from at least one compressed data source, with only incremental processing per synthesized view.

It is still another aspect of the present invention to provide improved methods and systems to synthesize plurality of views from at least one compressed data source, and transmit to at least one user-device.

It is still another aspect of the present invention to provide improved methods and systems to synthesize plurality of views, with support for dynamic (on-the-fly) updates to view synthesis parameters, from at least one compressed data source, and transmit to at least user-device.

It is still another aspect of the present invention to provide improved methods and systems to synthesize plurality of live or pre-recorded views with support for dynamic (on-the-fly) updates to view synthesis parameters, and transmit to at least one user-device.

It is still another aspect of the present invention to provide an improved system implementation and methods to record at least one data source and synthesize plurality of live or pre-recorded views with support for dynamic (on-the-fly) updates to view synthesis parameters, and transmit to at least one user-device.

The above and other aspects of the invention are achieved as will now be further described. Methods and systems for synthesizing a plurality of live or pre-recorded views, with on-the-fly adjustment to view parameters, from at least one compressed data source, and transmitting to at least one user-device are disclosed herein.

According to one method described herein, multi-resolution coefficients are extracted from video compressed using multi-scale image/video compression formats such as JPEG 2000 and Laplacian code (Burt, "The Laplacian Pyramid as a compact Image Code", IEEE Communications, April 1983, M. Unser, "An Improved Least Squares Laplacian Pyramid for Image Compression," Signal Processing, vol. 27, no. 2, pp. 187-203, May 1992). The multi-resolution coefficients for JPEG 2000 correspond to the wavelet coefficients, while the multi-resolution coefficients for Laplacian code correspond to Laplacian coefficients.

The extracted multi-resolution coefficients from at least one data sources are leveraged to perform computationally efficient multi-scale image processing for synthesis of plurality of views in the same multi-resolution representation as that of source data. The intermediate image processing steps may include multi-scale image alignment, color correction, warping, convolution and blending of multi-resolution coefficients extracted from source data. The synthesized views in multi-resolution representation are then encoded using the final stage of Huffman or arithmetic encoder, to generate compressed synthesized views. The said method is herein collectively referred to as Compressed Domain Multi-Scale View Synthesis.

The said Compressed Domain Multi-Scale View Synthesis method requires only partial decoding of source data, which eliminates need for computationally expensive full decompression of data sources and recompression of synthesized views. At the same time the said method avoids introducing extraneous compression artifacts and errors due to repeated decompression and then recompression. Further, efficient multi-scale image processing means adds only incremental processing cost, thereby enabling a scalable and computationally efficient means for synthesizing a plurality of views from at least one compressed data source.

According to another method disclosed herein describes methods and operational steps to synthesize a plurality of pre-configured set of views. A fixed set of view configurations are defined. A view configuration may consist of field of view, viewpoint, resolution, color format, bandwidth and frame rate parameters. Data in multi-resolution compression format is received from at least one data source. The compressed data is parsed and analyzed using Compressed Domain Multi-Scale View Synthesis method to synthesize a plurality of compressed views, one for each view configuration. The synthesized and compressed plurality of views is transmitted to at least one user device.

A data source may be configured as a digital camera, or a video camera, or a group of video cameras adapted to provide wide angle high view, or a network video recorder, or a media server. Data may be received from the data source through a wired or a wireless network router or a wireless or wired network. In addition, data may be preprocessed through a data format adapter to convert incompatible original data source format to a compressed multi-resolution format.

Each of the plurality of views is independently synthesized. Each view may correspond to an independent view configuration. Each such view may also be independently broadcast to multiple user-devices that subscribe to a particular view.

According to another method disclosed herein describes methods and operational steps to synthesize plurality of dynamically configurable set of views. A view manager is configured to maintain and support dynamic configuration of view configuration, user-device subscribers, view life-spans and view controllers. A regular check is performed for a range of view control messages and an active view request table is dynamically updated. A subset of data sources is dynamically selected such that it collectively covers the viewpoints and area of interest required to synthesize all views within the active view request table. Data in multi-resolution compressed data format is requested from selected data sources. The compressed data stream is selectively parsed to extract only relevant multi-resolution coefficients that are required for synthesis of the view in the active view request list. The extract multi-resolution coefficients are processed using computationally efficient and scalable Compressed Domain Multi-Scale View Synthesis method to synthesize a plurality of compressed views one for each of the active view requests. A synthesized view is then transmitted to associated list of user-devices. The said method thus enables computationally efficient and scalable synthesis of plurality of views that may be dynamically controlled by at least one user-device simultaneously.

One or more user-devices may subscribe to any view. However, at any time only one user-device for a view may be allowed to control the view parameters for that view at any time. The user-devices may be assigned priorities to arbitrate which user-device has control of that view. In any case, since the said method supports a plurality of views, a user-device requiring independent control may send a new view request to the system.

According to another method disclosed herein describes methods and operational steps to synthesize plurality of dynamically configurable set of view in both live and playback mode. At least one data recorder is configured to time stamp each frame and synchronously record at least one data source. At least one view manager is also configured to maintain and support dynamic configuration of view configuration enhanced with view time, user-device subscribers, view life-spans and view controllers. A regular check is performed for a range of view control messages and an active view request table is dynamically updated. The data recorders are searched based on the active view request table and at least one playback virtual data source is generated. Each virtual data source is associated with a start time and original data source ID. It may be the case that there is a plurality of virtual data sources each with unique start time but same data source ID. The compressed virtual data sources are parsed and Compressed Domain Multi-Scale View Synthesis method to synthesize a plurality of compressed views one for each of the active view requests with playback support. The compressed views are transmitted to associated list of user-devices. The said method enables synthesis of plurality of views that can be dynamically and independently controlled in both time and the usual view configuration parameters.

Each active view synthesis module, at configured frame-rate, and for configured duration, identifies and procures the set of required multi-resolution coefficients from the decoder module, warps and blends the coefficients to synthesize coefficients corresponding to the desired view. The synthesized coefficients are encoded using the multi-resolution compression format and transmitted to the associated user device, thereby enabling the user device to periodically receive updated view at configured frame-rate and for configured duration, and corresponding to dynamically adjusted view parameters.

Systems are also described herein for improved synthesis of plurality of views from at least one compressed data source. In one such system, at least one receiver for receiving data from external data sources, at least one processor for parsing compressed data sources and synthesizing the plurality of views, and at least one transmitter for broadcasting the synthesized views to the at least one user-device, is present. This system enables synthesis and broadcasting of a plurality of pre-configured views to at least one user-device. Additionally, the system may include a data adapter for converting non-compatible data source format into compatible multi-resolution format. The system may also include a user-device for further analysis or display of at least one synthesized view.

A system for synthesizing plurality of dynamically configurable set of views is also disclosed herein. Such a system generally includes at least high-bandwidth receiver for receiving data from at least one data source, at least one low-bandwidth receiver for receiving view control messages from the user-devices, at least one processor for view management, and parsing compressed data sources and synthesizing the plurality of views, and at least one transmitter for broadcasting the synthesized views to the at least one user-device.

A system for synthesizing plurality of dynamically configurable set of views with both live and instant playback support is also disclosed herein. Such a system generally includes at least high-bandwidth receiver for receiving data from at least one data source, at least one low-bandwidth receiver for receiving view control messages from the user-devices, at least one data recorder, at least one processor for view management, and parsing compressed data sources and synthesizing the plurality of views, and at least one transmitter for broadcasting the synthesized views.

BRIEF DESCRIPTION OF THE SEVERAL VIEWS OF THE DRAWING

The novel features believed characteristic of this invention are set forth in the appended claims. The invention itself, however, as well as a preferred mode of use, further objects, and advantages, will be best understood by reference to the following detailed description of illustrative embodiment when read in conjunction with the accompanying drawing, wherein:

FIG. 10-13 depict exemplary system configurations illustrating integration of present invention with other components, in accordance with an embodiment of the present invention.

DETAILED DESCRIPTION OF THE INVENTION

Figure 1:
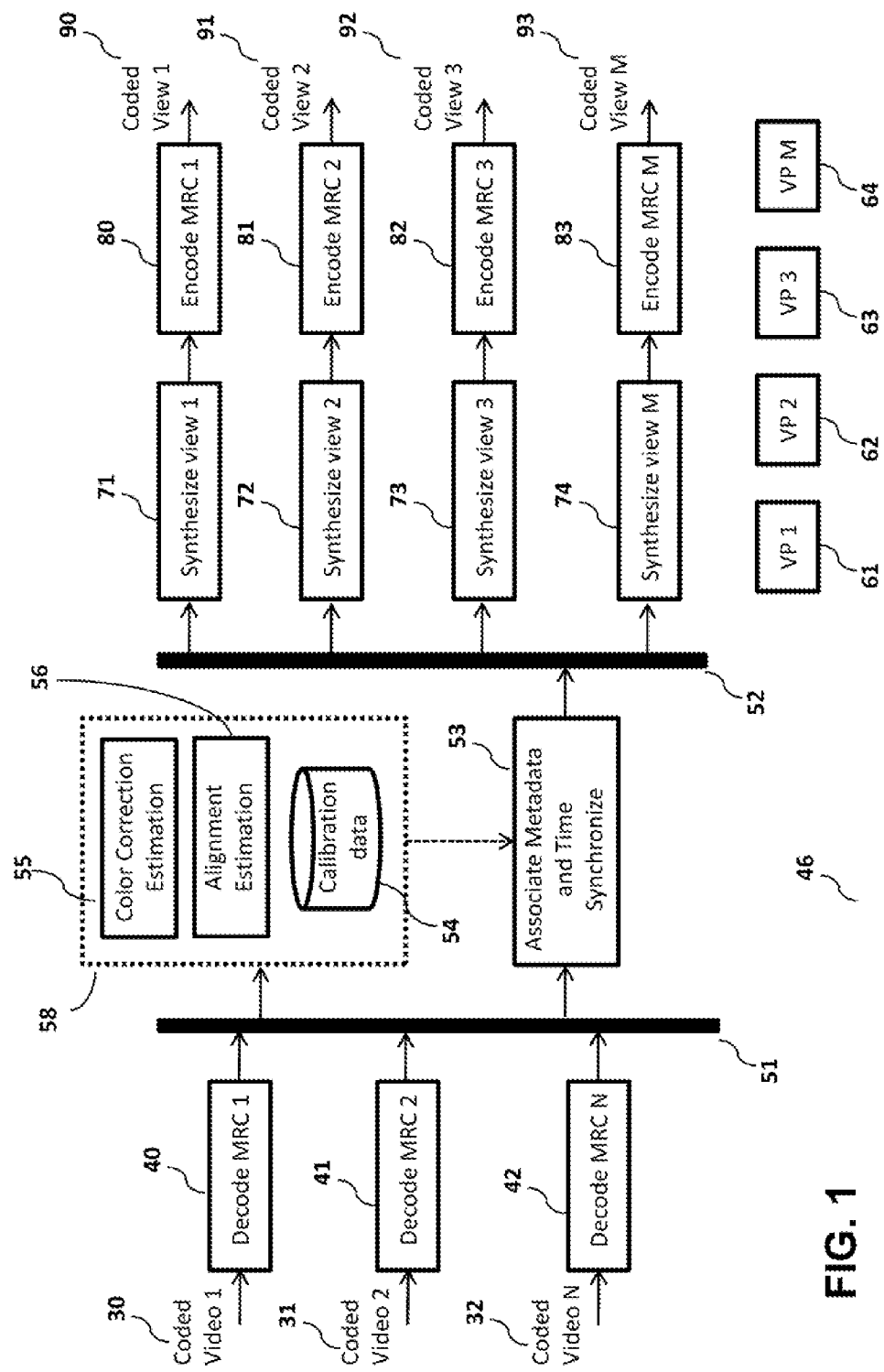
FIG. 1 depicts a block diagram illustrating method that provides computationally efficient synthesis of plurality of pre-configured views of a scene in compressed format from at least one compressed data source, in accordance with preferred embodiments of present invention.

FIG. 1 depicts a block diagram illustrating a method 46 that provides computationally efficient synthesis of plurality of pre-configured views of a scene in compressed format from at least one compressed data source, in accordance with preferred embodiments of present invention. The method takes a set of compressed data sources 30, 31, 32 as input. The Decode MRC modules 40, 41, 42 extract respective multi-resolution coefficients (MRC) data from respective data sources 30, 31, and 32. A time synchronized buffer module 51 timestamps, identity-stamps, synchronizes and buffers the MRCs. It also collates and organizes the MRC data into buckets (a logical data structure), such that each bucket contains MRC data and any metadata corresponding to a common timestamp. The MRC buckets are subsequently multi-cast to a Calibration Update module 58 and a Metadata Association module 53.

The Calibration Update module 58 processes the MRC buckets to update alignment and color correction parameters between data sources 30, 31, 32 and provides them to the Metadata Association module 53 upon request. It consists of calibration database 54, an alignment update module 56 and color correction update module 55. Calibration database 54 may contain pre-estimated and refined intrinsic (such as focal length and camera center) and extrinsic parameters (such as 3D orientation and location with respect to a common reference) about the data sources and color correction parameters. The alignment update module 56 periodically processes data in MRC buckets to further refine the intrinsic and extrinsic parameters of the data sources 30, 31, 32. Also, the color correction update module 55 periodically processes the data in MRC buckets to further refine the color correction parameters for the data sources 30, 31, 32. The refined parameters with timestamps are stored in the calibration database 54.

The Metadata Association module 54 upon receiving an MRC bucket extracts the common timestamp and requests the alignment and color correction parameters from calibration update module 58 corresponding to the extracted timestamp. The received parameters are added to the MRC bucket as additional metadata that describe the alignment and brightness relationship among the data sources 30, 31, and 32. The metadata enhanced MRC (hereafter referred to as MEMRC) buckets are pushed to another buffer module 52.

The buffer module 52, buffers the incoming MEMRC buckets and then multicasts them to a bank of View Synthesis modules 71, 72, 73, 74. The buffer module 52 also decouples output view synthesis processing from prior input data processing. The View Parameters 61, 62, 63, 64 specify the field of view, resolution, view point and frame-rate for the desired views. The View Synthesis modules 71, 72, 73, and 74, processes input MEMRC buckets to perform multi-resolution correct correction, warping, and fusion to generate respective view MRC based on respective View Parameters 61, 62, 63 and 64.

The view MRCs generated from View Synthesis Modules 71, 72, 73, and 74 are pushed to Encode MRC modules 80, 81, 82 and 83, respectively. The Encode MRC modules 80, 81, 82 and 83, encode respective input view MRC into respective compressed views 90, 91, 92, 93. A pairing of a View Synthesis Module and an Encode MRC module is hereafter referred to as a View Synthesis Pipeline. For example, the pair (71, 80) is a Video Synthesis Pipeline.

The data sources 30, 31, 32, are respectively labeled "Coded Video 1", "Coded Video 2" and "Code Video N", and associated Decode MRC modules 40, 41, 42 are respectively labeled "Decode MRC 1", "Decode MRC 2" and "Decode MRC N", to indicate that a plurality of data sources may be utilized in accordance with method 46. Although only three data sources and three associated Decode MRC modules are shown in FIG. 1, those skilled in the art will appreciate that additional or few data sources may be also implemented in accordance with method 46.

The output synthesized views 90, 91, 92, 93, are respectively labeled "Coded View 1", "Coded View 2", "Coded View 3" and "Coded View M", associated Encode MRC modules 80, 81, 82, 83 are respectively labeled "Encode MRC 1", "Encode MRC 2", "Encode MRC 3" and "Encode MRC M", and associated View Synthesis modules 71, 72, 73, 74 are respectively labeled "Synthesize View 1", "Synthesize View 2", "Synthesize View 3", and "Synthesize View 4", to indicate that a plurality of compressed views may be synthesized in accordance with method 46. Although only four output views with equal number of Encode MRC and Synthesize View modules are shown in FIG. 1, those skilled in the art will appreciate that additional or few output views may also be implemented in accordance with method 46.

The data source 32 and output view 93 are labeled "Coded Video N" and "Coded View M" to indicate that a plurality of output views may be synthesized from a plurality of input data sources, and their cardinality may be different. Although, the method 46 in FIG. 1 illustrates only four output views synthesized from only three input data sources, those skilled in the art will appreciate that additional or few input data sources and additional or few output views may also be implemented in accordance with method 46.

Those skilled in the art will also appreciate that a view synthesis pipeline may also implement synthesis of raw view, by replacing Encode MRC module with a module that transforms multi-resolution coefficients to raw imagery.

Figure 2:
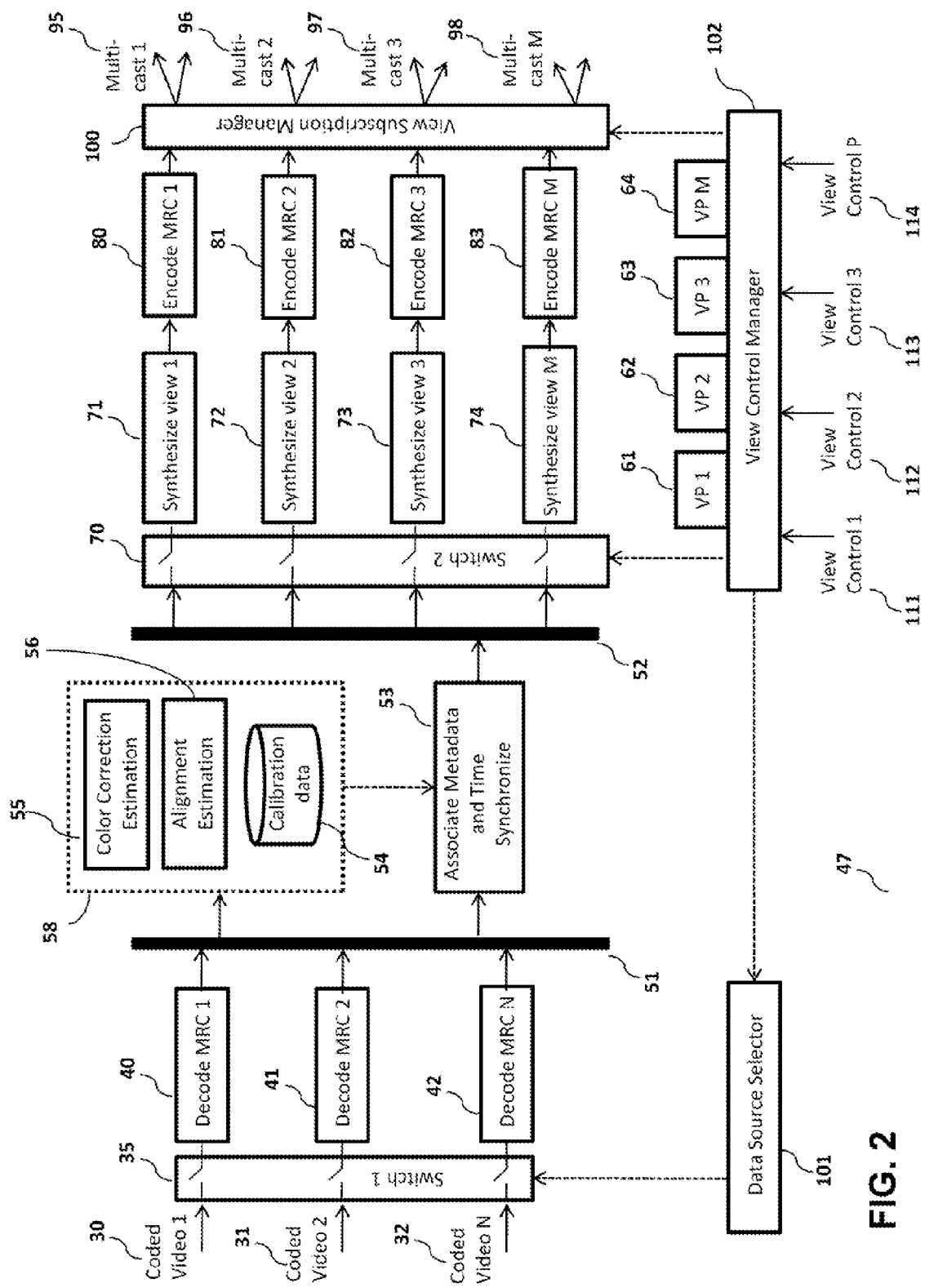
FIG. 2 depicts a block diagram illustrating method that provides computationally efficient synthesis of plurality of dynamically configurable views of a scene in compressed format from at least one compressed data source, in accordance with preferred embodiments of present invention.

FIG. 2 depicts a block diagram illustrating method 47 that provides computationally efficient synthesis of plurality of dynamically configurable views 90, 91, 92 and 93 of a scene in compressed format from a plurality of compressed data sources 30, 31 and 32, in accordance with preferred embodiments of present invention. Note that in FIG. 1 and FIG. 2 analogous parts are indicated by identical reference numerals. Thus, for example data sources 30, 31, 32 of FIG. 1 are analogous to data sources 30, 31, 32 of FIG. 2.

The key difference between method 46 of FIG. 1 and method 47 of FIG. 2 is that method 47 provides dynamic (on-the-fly) control over view synthesis, data source selection and view distribution. View synthesis, data source selection and view distribution are respectively controlled by View Control Manager 102, Data Source Selector 101, and View Subscription Manager 100.

Each of View Control Requests 111, 112, 113, 114 may be a request to modify View Parameters, activate new views or deactivate views, subscribe or unsubscribe a view. The View Control Requests 111, 112, 113, 114 are processed by the View Control Manager 102. The View Control Manager 102 is a master controller that performs dynamic configuration of View Parameters 61, 62, 63, and 64, and updates the View Subscription Manager 100 and Data Source Selector 101, based on View Control Requests 111, 112, 113, and 114.

In case a View Control Request is a request to modify View Parameters, the View Control Manager 102, may modify one or more of the View Parameters 61, 62, 63 and 64, which in turn governs the views synthesized by the View Synthesis Pipelines (71, 80), (72, 81), (73, 82) and (74, 83).

In case a View Control Request is a request to activate or deactivate a view, the View Control Manager 102, may modify one or more of the View Parameters 61, 62, 63 and 64, and inform the multi-port switch 70 to activate or deactivate corresponding View Synthesis Pipeline.

In case a View Control Request is a request to subscribe or unsubscribe a view, the View Control Manager 102, may forward the request to the View Subscription Manager 100. The View Subscription Manager 100 may then update its view subscription list corresponding to the view.

The View Control Manager 102 also informs the Data Source Selector 101 of any changes to the View Parameters 61, 62, 63 and 64. The Data Source Selection 101 processes these messages to determine a subset of data sources that may be required to synthesize output views as specified in the latest View Parameters 61, 62, 63, and 64. For example, if all the View Parameters 61, 62, 63 and 64 correspond to a subset of coverage area of data source 30, then only data source 30 is selected. Data Source Selector 101 uses the data source subset to control the multi-port switch 35. The multi-port switch 35 connects data sources within the selected subset and disconnects data sources not in the selected subset. The dynamic selection of data sources may reduce computational requirements, or, alternatively increase the number of data sources that can be processed within a given computational budget.

Compressed data from the connected data sources among the full set 30, 31, 32, is processed by respective Decode MRC modules 40, 41, 42, to generate respective MRC. The time synchronized buffer module 51 organizes the MRC output into time-synchronized MRC buckets, which are further processed by Calibration Update Module 58 and Metadata Association 54 to generate MEMRC buckets analogous to processing by parts 51, 58 and 54 of FIG. 1 in method 46. A buffer module 52, buffers the MEMRC buckets and multi-casts them to only the connected video synthesis pipelines. A multi-port switch 52 controls which Video Synthesis Pipeline is connected to the buffer module 52. The connected Video Synthesis Pipelines process the input MEMRC buckets to generate compressed synthesized views. The View Subscription Manager 100 multi-casts the compressed views synthesized using updated View Parameters 61, 62, 63, and 64 to the corresponding subscribed users.

Figure 3:
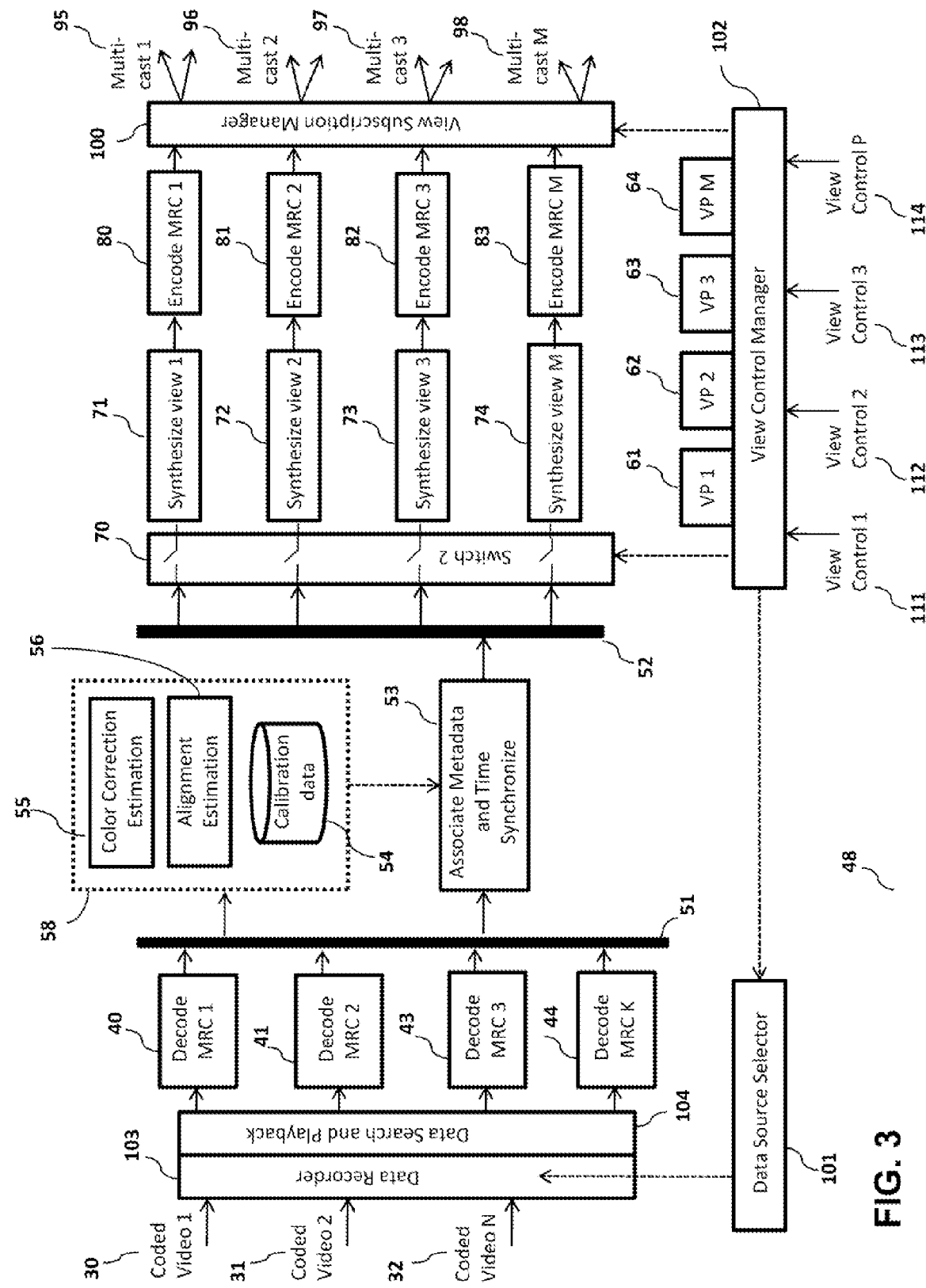
FIG. 3 depicts a block diagram illustrating method that provides computationally efficient synthesis of plurality of dynamically configurable live or replay views of a scene in compressed format from at least one compressed data source, in accordance with preferred embodiments of present invention.

FIG. 3 depicts a block diagram illustrating method 48 that provides computationally efficient synthesis of plurality of dynamically configurable live or replay views 90, 91, 92 and 93 of a scene in compressed format from a plurality of compressed data sources 30, 31 and 32, in accordance with preferred embodiments of present invention. Note that in FIG. 1, FIG. 2 and FIG. 3 analogous parts are indicated by identical reference numerals.

The key difference between methods 47 of FIGS. 2 and 48 of FIG. 3 is that method 48 provides data source recording, search and dynamically configurable live and or replay view synthesis. The method 48 replaces data source selection switch 35 with a Data Recorder module 103 and Data Search and Playback Module 104 to provide enhanced data source selection for a combination of live and replay. Further, the View Control Requests 111, 112, 113, 114, View Parameters 61, 62, 63, 64, View Control Manager 102 and Data Source Selector 101 are configured to support "view time".

The View Control Requests 111, 112, 113, 114 of FIG. 3 that request modification to View Parameters may also include one or more time parameters that identify a time instant. The time parameters may be specified as standard date and time, a time bookmark, or an unambiguous event description. The View Control Manager 102 processes these requests, and may accordingly update one or more View Parameters 61, 62, 63, and 64, and switch 52 to activate or deactivate View Synthesis Pipelines (71, 80), (72, 81), (73, 82) and (74, 83).

The View Control Manager 102 also informs the Data Source Selector 101 of modifications to any of the View Parameters 61, 62, 63, and 64. The Data Source Selector 101 processes the messages from View Control Manager 102 and compiles a list of data sources. The list may include a combination of live and recorded data sources replayed from different time instants. For example, it may be the case that there are multiple data sources that corresponding to the same original data source but different start times. The Data Source Selector 101 configures the Data Search and Playback module 104 to initiate playback of the identified list of recorded data sources as per their replay time and any live data sources.

The Data Recorder module 103 receives the live data sources 30, 31, 32, and records them. The Data Search and Playback module 104 accesses the Data Recorder module 103 to retrieve the live or recorded data sources 36, 37, 38, 39 as configured by Data Source Selector 101 and pushes them to the associated Encode MRC modules 40, 41, 42, 43. The MRC data generated by Encode MRC modules 40, 41, 42, 43 is further processed and distributed analogous to method 47 described in FIG. 2.

Figure 4:
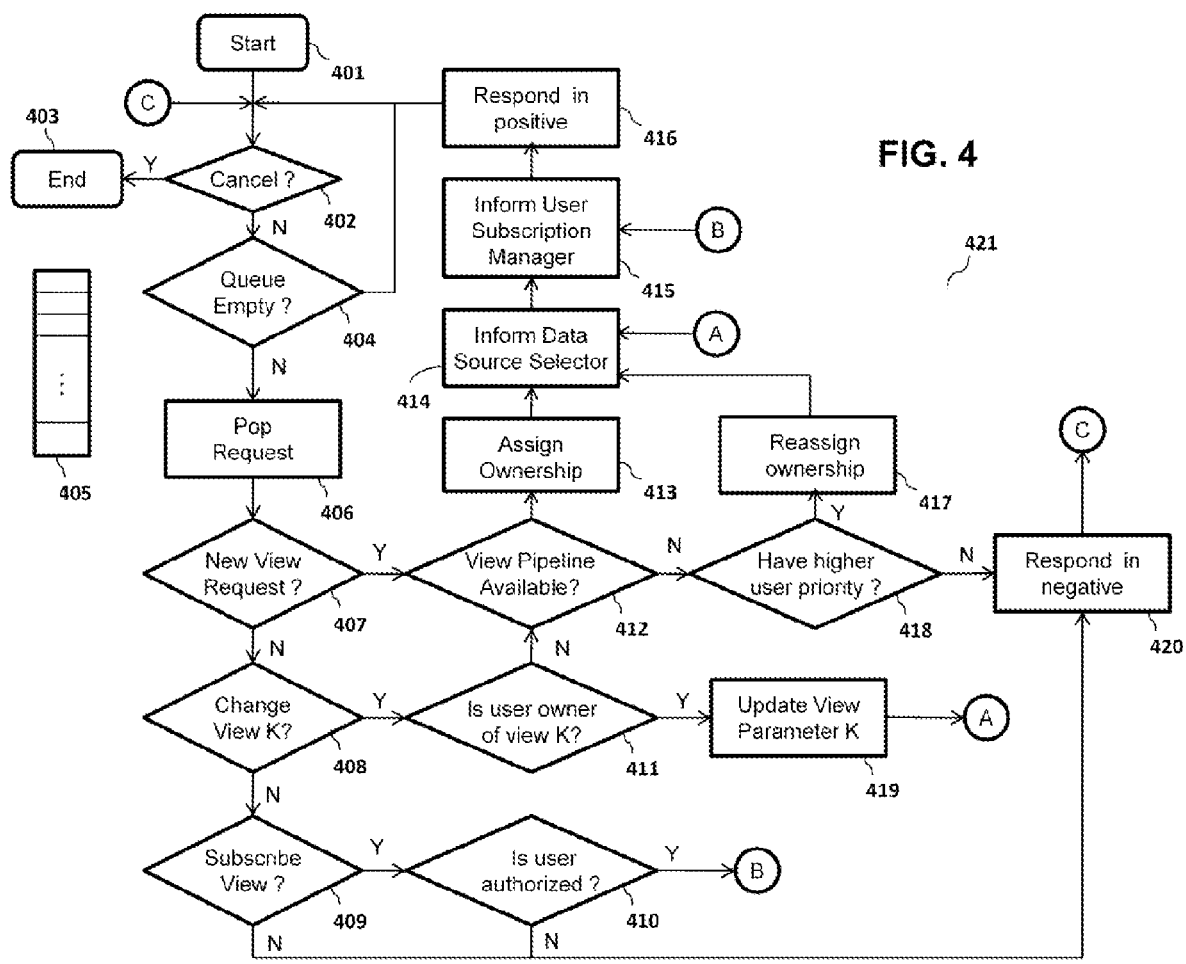
FIG. 4 illustrates a flowchart illustrative of detailed operation of dynamic configuration of view synthesis by user devices, which may be utilized in accordance with preferred embodiments of the present invention

FIG. 4 illustrates a flowchart illustrative of detailed operation of the View Control Manager 102, which may be utilized in accordance with preferred embodiments of the present invention. The View Control Manager 102 upon initialization commences at label 401, after which it immediately flows to decision block 402, to detect if the View Control Manager 102 has been asked to terminate. If not terminated, decision block 404 continually checks the View Control Request Queue 405 has any pending requests, until the View Control Manager is terminated.

Upon availability of a request, function block 406 "pops" a request from the View Control Request Queue 405. The request is checked against three conditions described herein.

Decision block 407 checks if request is for requesting control of a new view. If "yes", decision block 412 further checks if there are spare View Synthesis Pipelines available. If "yes", functional blocks 413, 414, 415 and 416 reserve a spare View Synthesis Pipeline and assign the requesting user as owner of the view, inform the Data Source Selector 101, inform the View Subscription Manager 100, and respond in positive to the request, respectively, and control loops back to beginning of decision block 402. If decision block 412 response is "no", decision block 418 checks if requesting user has higher priority than owners of other views. If "yes" function block 417 may re-assigns ownership of one such view to the requesting user, followed by actions of function blocks 414, 415 and 416 described earlier. If decision block 412 responds "no", then function block 420 responds in negative to the request and returns control back to beginning of decision block 402.

Decision block 408 checks if request is to update View Parameters for a view. If "yes", decision block 411 checks if the requesting user is the owner of the view. If "yes", function block 419 updates the View Parameter associated with the view, followed by actions of function blocks 414, 415 and 416 described earlier. If decision block 411 responds "no", View Control Manager 102 may optionally give another opportunity to instead treat the request as request for a new view but with requested view parameters, and forward control to decision block 412. The processing in decision block 412 and further is described above.

Decision block 409 checks if request is to subscribe or unsubscribe to an existing view. If "yes", decision block 410 checks if the requesting user is authorized to subscribe or unsubscribe to the specified view. If "yes", function block 415 informs View Subscription Manager 100, function block 416 responds in positive and flow return back to beginning of decision block 402. If decision block 410 responds "no", function block 420 responds in negative to the request and flow return back to the beginning of decision block 402.

Figure 5:
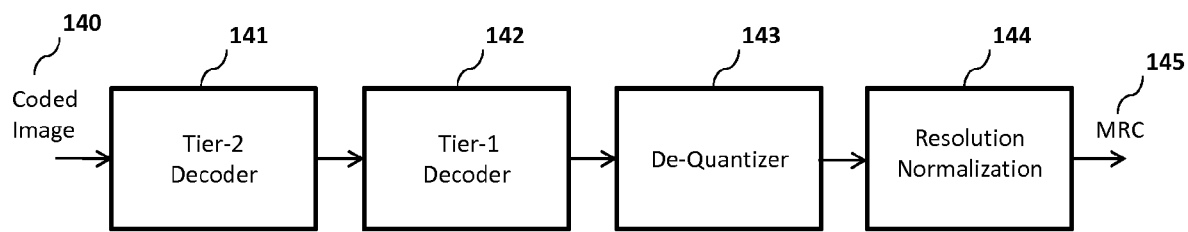
FIG. 5 depicts a prior art pictorial representation of multi-resolution coefficients.
Figure 7:
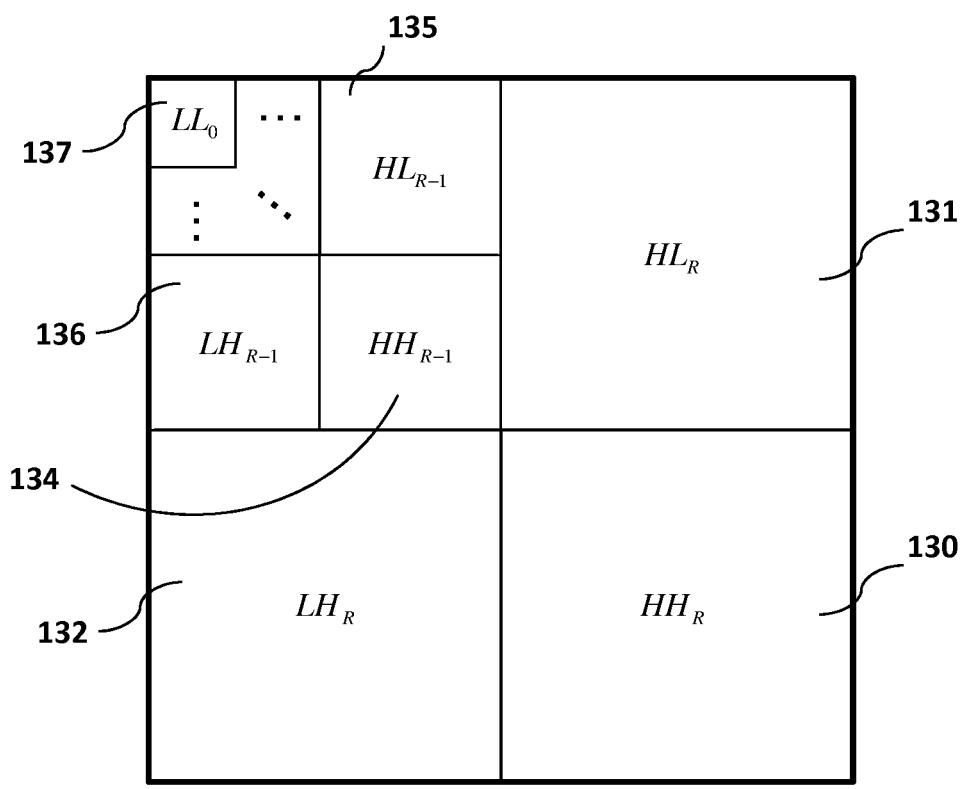
FIG. 7 depicts a block diagram illustrating in greater detail method that provides extraction of multi-resolution coefficients from a compatible compressed data source, in accordance with preferred embodiments of present invention.

FIG. 5 depicts a pictorial representation of MRC data, which may be utilized in accordance with preferred embodiments of the present invention. For illustrative purposes, it may be assumed that the multi-resolution coefficients are multi-resolution wavelet coefficients extracted from a JPEG 2000 compressed stream. FIG. 7 illustrates the output from an R-level wavelet transform. $HL_{R-1}$ 131 is the wavelet sub-band corresponding to horizontal high-pass and vertical low-pass filter at resolution (R-1), $LH_{R-1}$ 132 is the wavelet sub-band corresponding to horizontal low-pass and vertical high-pass filter at resolution (R-1), $HH_{R-1}$ 130 is the wavelet sub-band corresponding to horizontal high-pass and vertical high-pass filter at resolution (R-1). The $LL_{R-1}$ (not shown) is the wavelet sub-band corresponding to horizontal low-pass and vertical low-pass filter at resolution (R-1). The $LL_{R-1}$ is iteratively represented using (R-1)-level decomposition as $HL_{R-2}$ 135, $LH_{R-2}$ 136, $HH_{R-2}$ 134, and $LL_{R-2}$. $LL_0$ 137 corresponds to the low-pass horizontal and low-pass vertical component after R iterations of wavelet decomposition.

Figure 6:
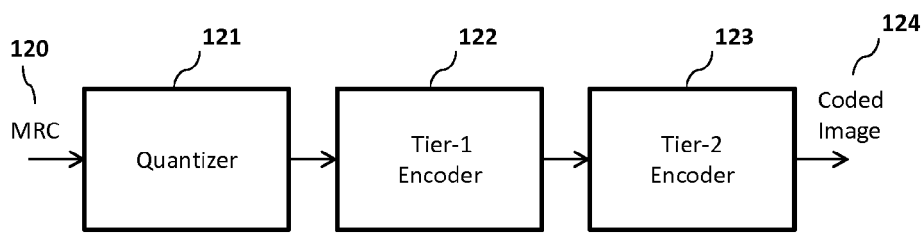
FIG. 6 depicts a block diagram illustrating in greater detail method that provides encoding of multi-resolution coefficients into compressed output image, in accordance with preferred embodiments of present invention.

FIG. 6 depicts a block diagram illustrative of a method 80 to encode MRC data 120 into a coded image 124 using a multi-resolution compression format, which may be utilized in accordance with preferred embodiments of the present invention. The Quantizer 121, Tier-1 Encoder 122, and Tier-2 Encoder 123, are specific to compression format used for encoding. For illustrative purposes, it may be assumed that the underlying compression format is JPEG 2000. A detailed description of parts 121, 122 and 123 is well documented in prior art, and are briefly summarized herein. The input MRC data 120 is quantized by Quantizer 121. The quantized MRC data is arithmetic encoded using Tier-1 Encoder 122. The Tier-2 Encoder 123 further packetizes and formats the output of part 122 to generate the compression format compatible coded image 124.

FIG. 7 depicts a block diagram illustrative of a method 40 to extract MRC 145 from a coded image 140 compressed using a multi-resolution compression format, which may be utilized in accordance with preferred embodiments of the present invention. The parts Tier-2 Decoder 141, Tier-1 Decoder 142, and De-Quantizer 143 are specific to compression format used for coded image 140. For illustrative purposes, it may be assumed that the coded image 140 is compressed using JPEG 2000. A detailed description of parts 141, 142 and 143 is well documented in prior art, and are briefly summarized herein. A coded image 140 represented as a sequence of bytes in JPEG 2000 format is input Tier-2 Decoder 141. The Tier-2 Decoder 141 parses and de-packetizes the coded image. The Tier-1 Decoder 142 performs arithmetic decoding to extract the quantized multi-resolution coefficients. The De-Quantizer 142 finally performs any de-quantization to remove any coefficient bias.

The Resolution Normalization Module 144 is responsible for ensuring a common resolution level structure is used across data sources with differences in pixel resolution and field of regard. Consider the following illustrative situations. First, given two co-located data sources camera 1 and camera 2, such that camera 1 has 1024×1024 pixel resolution and horizontal FOV 30 degrees, and camera 2 with same 1024× 1024 pixel resolution but with horizontal FOV of 15 degrees. In this case, although the cameras have same pixel resolution, the angular resolution of camera 2 is twice (along azimuth and elevation) to that of camera 1. Those skilled in the art may appreciate the need to consider information at similar angular resolutions to reduce aliasing and seams. In this case, a resolution level R for camera 1 corresponds to resolution level R-1 for camera 2.

Second, consider two co-located JPEG 2000 compressed data sources camera 1 and camera 2 with identical pixel resolution and field of view. However, their respective compressions used different number of resolution levels. This disparity in number of resolution levels need to be addressed to support data fusion at all resolution levels.

The Resolution Normalization Module 144 performs three main tasks. First, it defines a common standard for resolution across all data sources. The common standard for resolution may be angular resolution (useful for co-located cameras) or the more general ground sampling distance (useful for cameras that may not be co-located). Second, it processes the camera calibration information to map the extracted resolution sub-bands to the common standard. Third, generate data corresponding to the missing resolution bands for data sources for which the extracted MRC are missing one of more common resolution bands. If any of the high-resolution bands are missing, those are generated as zero-valued images. If the low resolution bands are missing, those are creating by iteratively decomposing the lowest available LL band.

The output of Resolution Normalization Module 144 is MRC 145 extracted from code image 140 which are associated to a common set of resolution levels used across all data sources. The multi-resolution coefficients for JPEG 2000 compression format are organized as sub-bands as illustrated in FIG. 5 and as described above.

For illustrative purposes only, FIG. 5-7 have used JPEG 2000 compressed data sources. The methods described herein are also applicable to codecs based on multi-scale transforms such as those described in Burt, "The Laplacian Pyramid as a compact Image Code", IEEE Communications, April 1983, and M. Unser, "An Improved Least Squares Laplacian Pyramid for Image Compression," Signal Processing, vol. 27, no. 2, pp. 187-203, May 1992.

Figure 8:
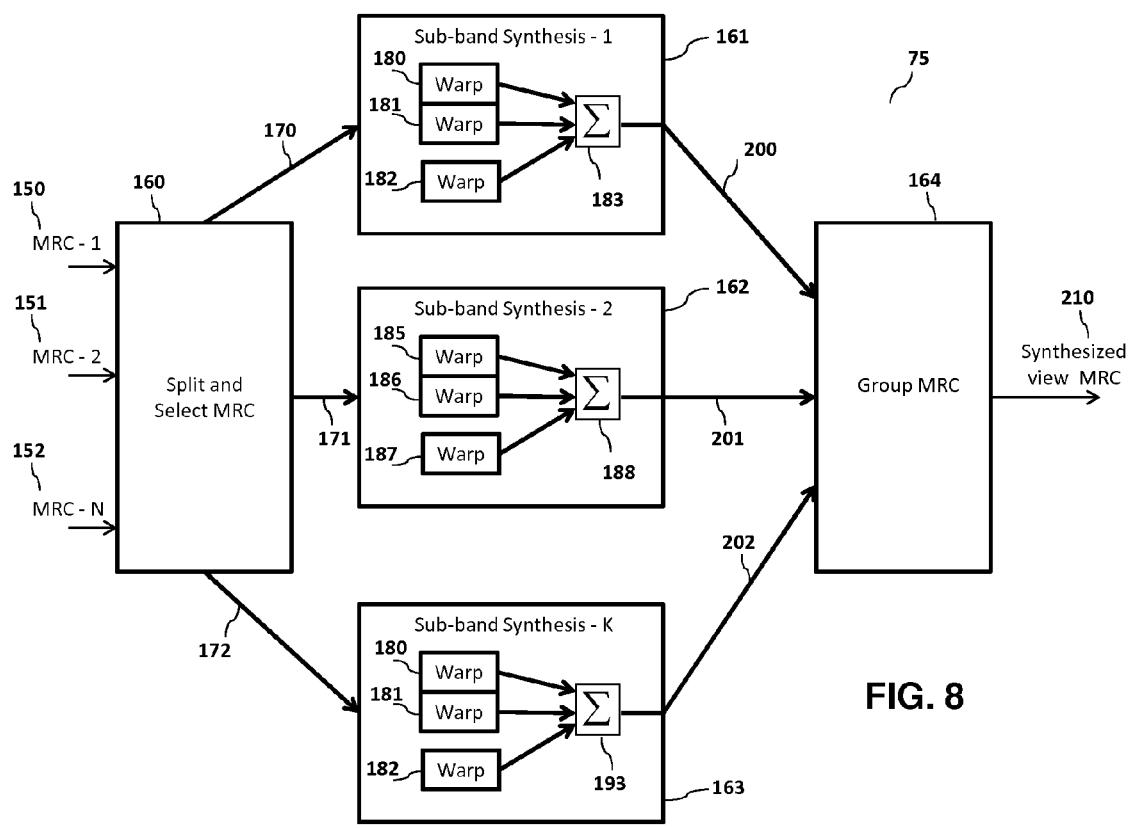
FIG. 8 depicts a block diagram illustrating in greater detail method that provides view synthesis from multi-resolution coefficients extracted from at least one compressed data source, in accordance with preferred embodiments of present invention.

FIG. 8 depicts a block diagram illustrative of a method 71 to synthesize MRC of a view 210 using MEMRC input data 150, 151 and 152, in accordance with preferred embodiments of the present invention. The Split and Select MRC module 160 logically groups the MEMRC data 150, 151, and 152 into sub-band groups 170, 171, 172. For example, 170 may correspond to $LL_0$ sub-band grouped from one or more MEMRC input data among 150, 151, and 152, while 171 may correspond to $HL_2$ sub-band grouped from one or more MEMRC data among 150, 151, and 152.

The Split and Select MRC module 160 also process the associated View Parameter 61 to select a subset of MEMRC data among input 150, 151, and 152 required to synthesize view specified in View Parameter 61. For example, View Parameter 61 may specify a view whose field of view is contained entirely within the field of views of data sources associated with inputs 150 and 151, in which case the sub-band group 170 may contain sub-bands $LL_0$ from only 150 and 151. Further, not all sub-bands may be required to synthesize the view specified in View Parameter 61. For example, if highest resolution sub-band in MEMRC 150 is of resolution 1024×1024, and View Parameter 61 only requires a resolution less than 512×512, then the highest resolution sub-band in MEMRC 150 is not required, and thus no sub-band group is created corresponding to that resolution level.

Further, the Split and Select MRC module 160 invokes one or more Sub-band View Synthesis modules among 161, 162 and 163, and respectively forwards the MEMRC sub-band groups 170, 171 and 172. The Sub-band Synthesis modules 161, 162 and 163 respectively process input MEMRC sub-band groups 170, 171 and 172 to synthesize respective sub-band for the view prescribed in View Parameter 61. Each of the Sub-band Synthesis modules 161, 162 and 163 are functionally identical, but process different sub-band groups. We herein describe the Sub-band Synthesis module 161 as an illustration of the processing within modules 161, 162 and 163.

The Sub-band Synthesis module 161 consists of an array of warp modules 180, 181 and 182, and a sum module 183. It assigns a warp module to each MEMRC sub-band within the input MEMRC sub-band group 170. A warp module performs the following four tasks: (1) Creates an image canvas (a two-dimension image grid) corresponding to the View Parameter 61 with a resolution corresponding to the resolution level of input sub-band group 170, (2) Computes the alignment parameters of the input sub-band to the image canvas based on the metadata embedded in the input MEMRC sub-band, (3) Compute the color adjust parameters based on the metadata embedded in the input MEMRC sub-band, and (4) Uses the alignment and color adjustment parameters to warp the input sub-band onto the image canvas using back-projection. There may be portions of the image canvas that may fall outside the image boundary of the input sub-band image after back-projection; such locations on the image canvas are set to zero.

The output of the warp modules is sent to a sum module 183. The sum module adds the output of the warp modules and normalizes the pixel-wise sum to create a single sub-band image 200. The synthesized sub-band image 200 is the synthesized image corresponding to one of the sub-bands of the desired view as assigned to Sub-band Synthesis module 161. The Group MRC module 164 collects and assembles the synthesized sub-band images 200, 201, 202 respectively from Sub-band Synthesis modules 161, 162, and 163. The output 210 of Group MRC module is MRC corresponding to a synthesized view as prescribed in View Parameter 61.

Figure 9:
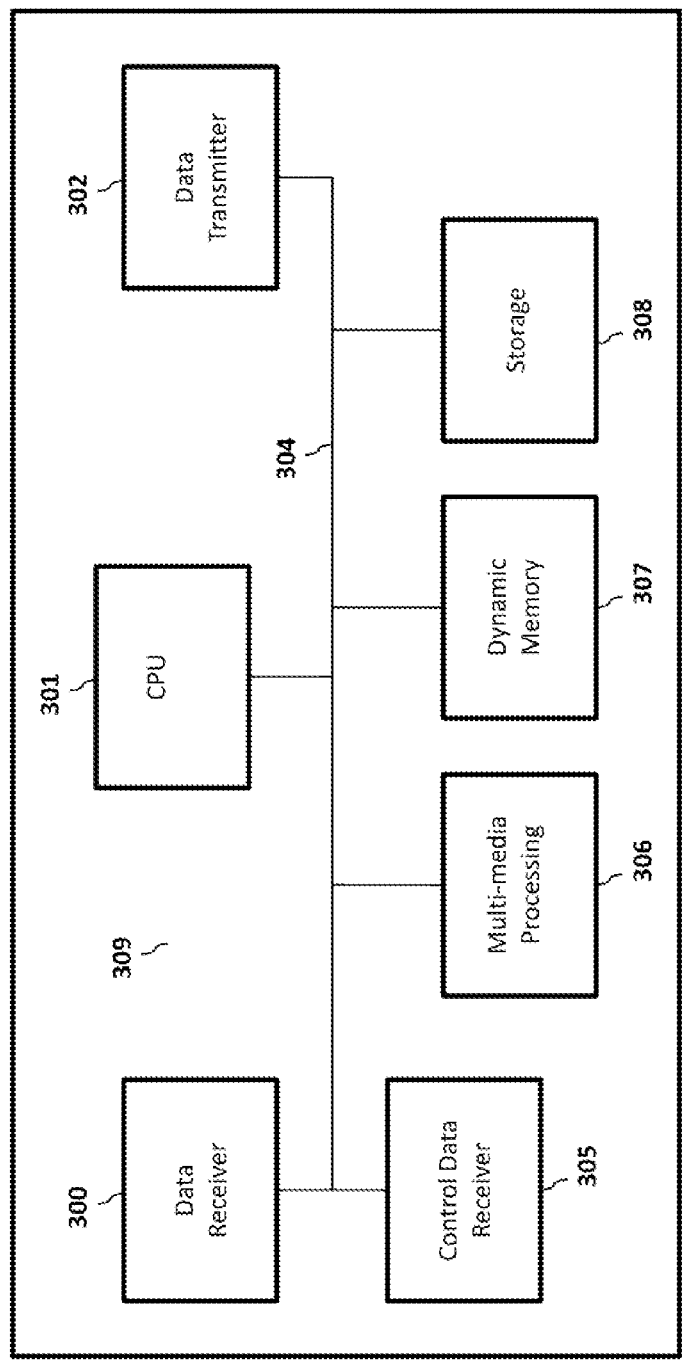
FIG. 9 depicts a schematic diagram illustrating a high-level hardware configuration of a server 309, in accordance with an embodiment of the present invention.

FIG. 9 depicts a schematic diagram illustrating a high-level hardware configuration of a computer-based Server 309, in accordance with an embodiment of the present invention. Those skilled in the art can appreciate, however, that other hardware configurations with less or more hardware and/or modules may be utilized in carrying out the methods and systems of the present invention. CPU 301 of server performs as the main controller of other components and main processing work horse for manipulating data. The CPU 301 may be physically composed of one or more processing chips, each of which may be single or multi-core. CPU 301 is generally coupled to an internal bus 304 so that it may be interconnected to respective components.

A Multi-Media processing module 306 may be available to the CPU 301 for off-loading computationally-intensive processing tasks. This may be configured as specialized multimedia processing hardware such as Digital Signal Processing (DSP) hardware, Graphics Processing Unit (GPU) hardware, specialized ASIC and FPGA based hardware, with associated drivers and multi-media processing software.

Data Receiver 300 under CPU 301 control serves to interface with data sources to receive data. This may be configured as industry standard interfaces such as Ethernet, IEEE 1394, USB, Channel Link, fiber channel, HDMI, Component Video, Composite Video, or a combination thereof, or custom high-speed interfaces, along with associated drivers. The Data Receiver 301 captures data from one or more data sources and transfers it over the internal bus 304. Portions or whole of the transferred data may be directly processed by CPU 301, and/or temporarily buffered in Dynamic Memory 307, and/or stored in Storage 308 for later processing, longer-term storage and/or playback.

The Control Data Receiver 305 under CPU 301 control serves to interface with user devices to receive View Control Requests, and other auxiliary control commands such as remote server administration commands. The Control Data Receiver 305 may also be used to send response to View Control Request back to the associated user devices, and exchange respective health and status messages. The Control Data Receiver 305 may be configured as industry standard interfaces such as Ethernet, IEEE 1394, USB, Channel Link, Serial port, or a combination thereof, or custom control interfaces, along with associated drivers.

The Data Transmitter 302 under CPU 301 control serves to interface with user devices to transmit synthesized views. This may be configured as industry standard interfaces such as Ethernet, IEEE 1394, USB, Channel Link, fiber channel, HDMI, Component Video, Composite Video, or a combination thereof, or custom high-speed interfaces, along with associated drivers.

Figure 10:
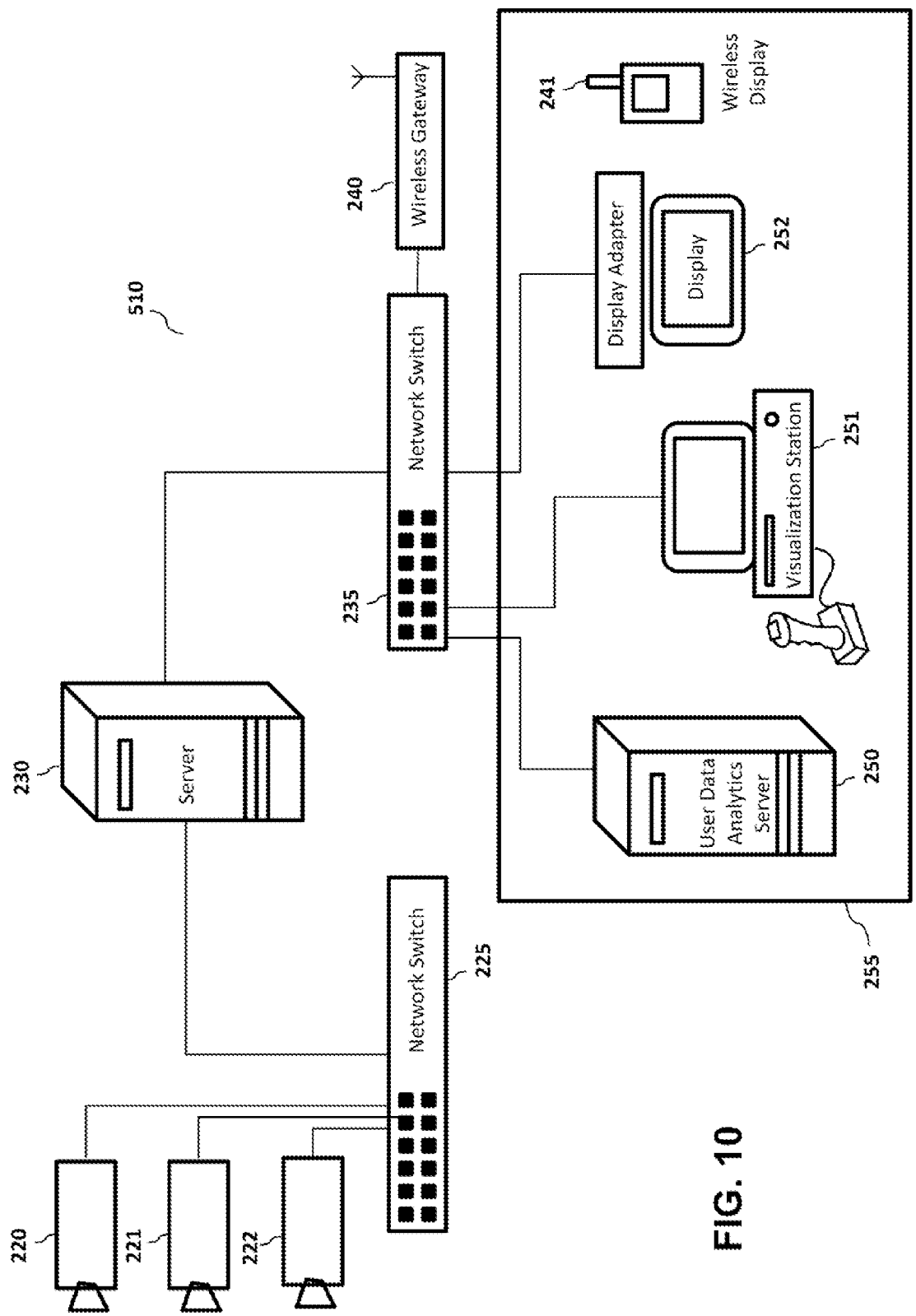

FIG. 10 depicts an exemplary video processing system configuration 510 in accordance with an embodiment of the present invention. The present invention is embodied in the Server 230. For illustration purposes only, Server 230 is configured to employ method 47 illustrated in FIG. 2, FIG. 10 and description herein also illustrates novel applications and benefits enabled by Server 230. The exemplary system configuration employs two network switches 225 and 235. Network Switch 225 is functionally used to interface the Server 230 to input data sources configured as IP cameras 220, 221 and 222, and Network Switch 235 is functionally used to interface the Server 230 to a set of output user devices 255 configured as User Data Analytics Server 255, Visualization Station 251, Display 252 and Wireless Display 241.

For illustrative purposes only, it may be assumed that the cameras 220, 221 and 222 are configured to provide JPEG 2000 compressed output. The Server 230 receives and processes the JPEG 2000 compressed data from the IP cameras 220, 221 and 222 and transmits the synthesized views in JPEG 2000 compressed format to the user devices 241, 250, 251 and 252, in accordance with the preferred embodiments of the present invention described earlier.

User device 250 is configured as a User Data Analytics Server. This user device illustrates a video processing server and may be configured to perform automated video analysis such as motion detect, perimeter breach detection, loitering, left object detection, or behavioral analytics such as people or vehicle counting. User device 250 may request one or more views from Server 230 when it is configured. The views may be requested at resolutions that user device 250 needs for analysis. The user device 250 may update the view parameters for one or more views by sending a View Control Request to Server 230.

User device 251 is configured as a Visualization Station. This user device illustrates a video visualization system and may be configured to request and simultaneously render one or more views on its display for visual assessment. The user device 251 may also provision for one or more of user control peripherals such a keyboard, mouse and joystick. The user device 251 may update the view parameters for one or more views by sending a View Control Request to Server 230. The View Control Requests can be used to reposition views, or add or remove views. The views may be requested at different resolutions depending upon the display resolution they are assigned to minimize network bandwidth and computational needs for rendering. Further, one or more views may be controlled as Pan, Tilt Zoom cameras by continuously sending View Control Requests with updated absolute view parameters or relative adjustments.

User device 252 is configured as a High-Definition 1080 P display. The user device 252 illustrates a standard HD television display that may support multiple channels. A display adapter may request one 1080 P for every active channel, or one 1080 P as the background display for the active channel and may be lower resolution views of other channels that may viewed as Picture-in-Picture, or a set of may be low resolution views one for each channel that are displayed as a matrix. The display adapter converts the compressed data to a format supported by the display, provides support for multiple channels, and interacts with Server 230 to request and configure views. Each channel may correspond to one or more views. The display 252 may be equipped with a remote control or wired controls to select channels and control view parameters.

User device 241 is configured as a Wireless Display. The user device 241 may be a cellular phone, smartphone, Personal Digital Assistant (PDA), Netbook, or a Laptop with wireless connectivity such as WiFi and GPRS/3G, and a display. The user device 241 may be interfaced to the Network Switch 235 via a Wireless Gateway 240. The Wireless Display 241 may request one or more views from the Server 220. The user device 241 may request one or more views using View Control Requests to the Server 220 at configurable resolutions so as to match the screen resolution assigned to the respective views. It may also control the view frame-rate and compression bit-rate using View Control Requests to adjust to the network bandwidth available to the user device. The user-device may also be able to adjust other view parameters such as field of view and viewpoint to provide enhanced visualization to the user.

Figure 11:
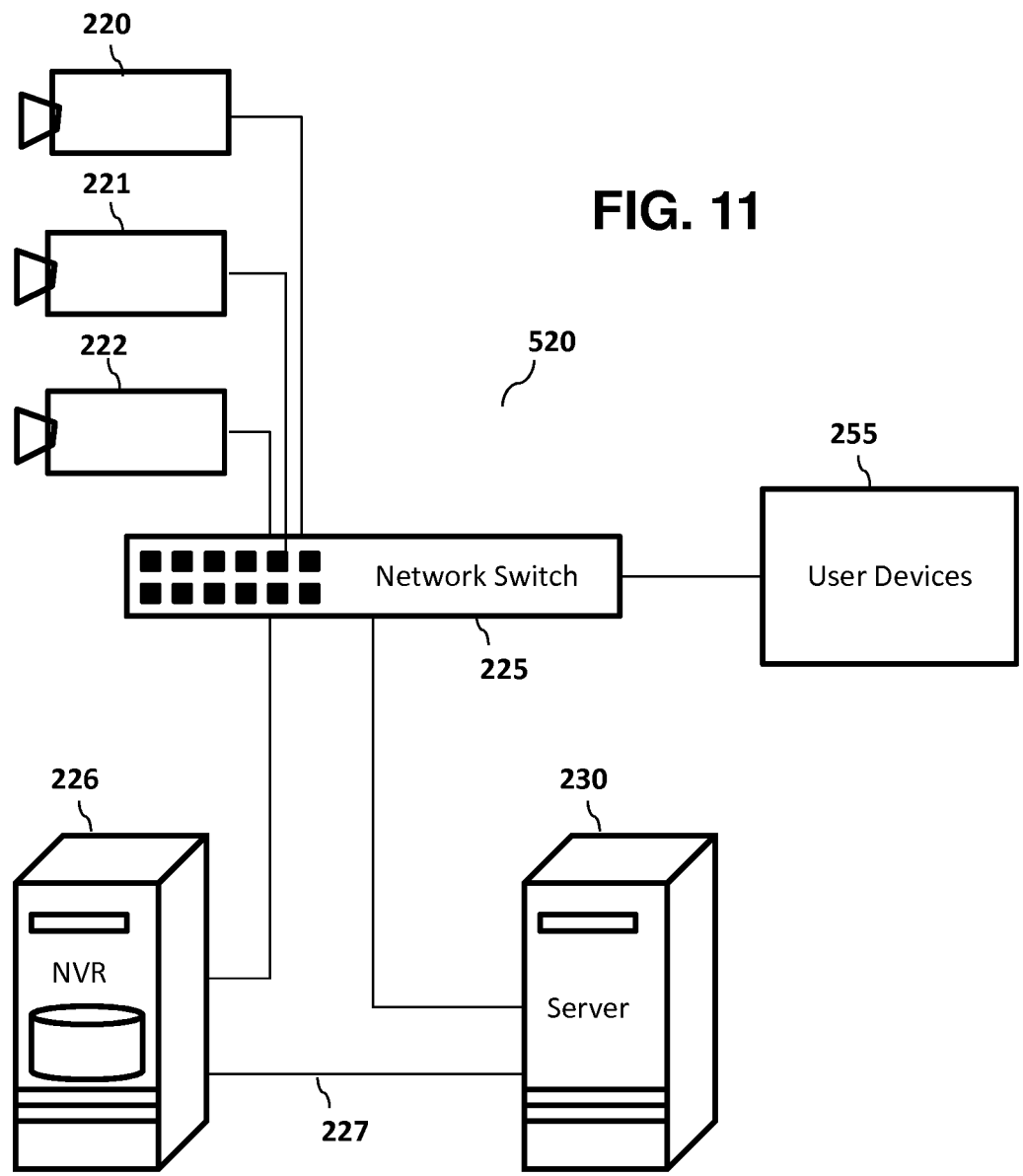

FIG. 11 depicts another exemplary video processing system configuration 520 in accordance with an embodiment of the present invention. The present invention is embodied in the Server 230. For illustration purposes only, Server 230 of FIG. 11 is configured to employ method 48 illustrated in FIG. 3. The exemplary system configuration employs Network Switch 225 as a means to interface all other components, namely the data sources 220, 221 and 222, NVR 226, Server 230 and User Devices 255. The Server 230 is connected to two sets of data sources. The IP cameras 220, 221 and 222 provide "live" data of the scene. The "live" data is recorded by a NVR 226, which also acts as data sources for recorded or "non-live" data.

The Server 230 in FIG. 11 may access both live and recorded data as required to synthesize the views as configured by the set of user devices 255. This configuration enables user devices to independently and dynamically visualize different parts of the scene from multiple perspectives in both live and recorded mode.

Figure 12:
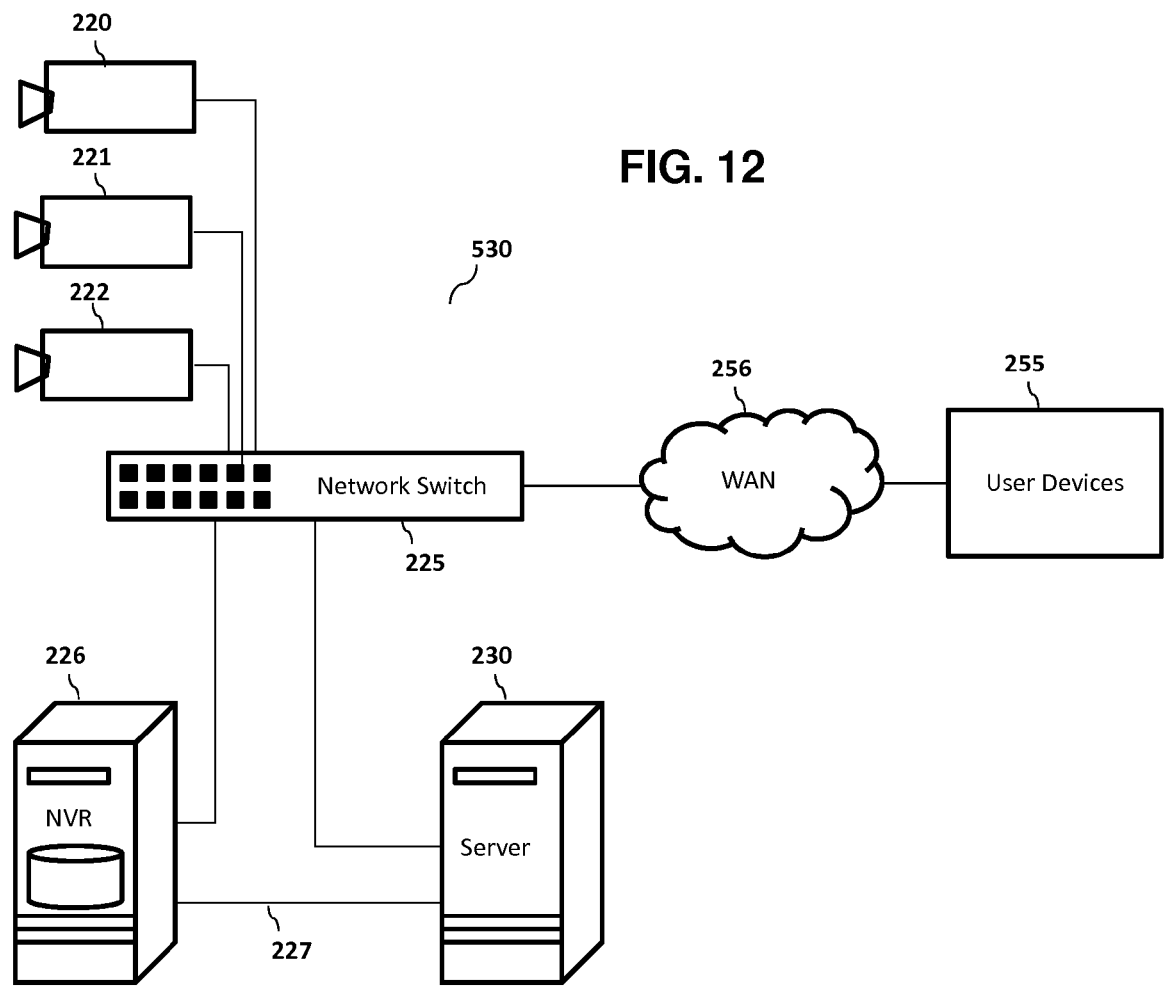

FIG. 12 depicts another exemplary video processing system configuration 530 in accordance with an embodiment of the present invention. The present invention is embodied in the Server 230. For illustration purposes only, Server 230 of FIG. 12 is configured to employ method 48 illustrated in FIG. 3. The exemplary system configuration employs Network Switch 225 as a means to interface all other components. The Server 230 is connected to two sets of data sources. The IP cameras 220, 221 and 222 provide "live" data of the scene. The "live" data is recorded by a NVR 226, which also acts as data sources for recorded or "non-live" data. The key difference between system configuration 520 of FIG. 11 and system configuration 530 of FIG. 12 is that the User Devices 255 in configuration 530 interact with the Server 230 over a Wide Area Network (WAN) 256. This configuration may enable user devices 255 to independently view events over the area of coverage of the camera either live or in replay mode and from one or more viewpoints that can dynamically configured by the user-device, and at resolutions and frame-rates that can individually configured by each user-device.

FIG. 13 depicts another exemplary video processing system configuration 540 in accordance with an embodiment of the present invention. The present invention is embodied in the Server 230. For illustration purposes only, Server 230 of FIG. 12 is configured to employ method 48 illustrated in FIG. 3. The exemplary system configuration employs Network Switch 225 as a means to interface all other components. The Server 230 is connected to a Media Server 227, and User Devices 255 interface with the Server 230 over a WAN 256. This configuration may enable user-devices 255 to independently view streaming pre-recorded media "on-demand" with advanced time, time tag, or event description based media cueing, rewind, forward or backward play, from one or more viewpoints that can dynamically configured by the user-device, and at resolutions and frame-rates that can individually configured by each user-device.

The invention claimed is:

1. A method to synthesize at least one output view from at least one JPEG 2000 or Laplacian compressed image source comprising:
    a) image processing method for decoding and processing the at least one compressed image source to generate multi-resolution coefficients, said decoding and processing comprising:
        (i) Tier 2 decoding to parse and de-packetize the coded video;
        (ii) Tier 1 decoding to perform arithmetic decoding to extract quantized multi-resolution coefficients;
        (iii) de-quantization to remove any bias; and
        (iv) resolution normalization to create a common set of resolution bands across all image sources;
    b) a set of view synthesis parameters for each output view; and
    c) at least one view synthesis pipeline for processing the multi-resolution coefficients to synthesize at least one view based on the corresponding view synthesis parameters.

2. The method of claim 1, wherein each view synthesis pipeline, further comprising:
    (i) module for selection of multi-resolution coefficients;
    (ii) a set of synthesis modules for warping, color adjustment and blending each resolution band;
    (iii) reassembly of the synthesized resolution bands; and
    (iv) either of encoding of synthesized resolution bands to generate compressed view or decoding of synthesized resolution bands to generate un-compressed view.

3. A video processing system comprising: a computer server and the computer readable medium containing instructions that, when executed by a processor, cause the processor to perform the method according to claim 1.

4. The video processing system of claim 3, further comprising: at least one compressed video source; means for receiving the at least one compressed video source; at least one user device; and means for transmitting synthesized views to at least one user device.

5. The video processing system of claim 4, further comprising: a media server with recording, search and playback support.

6. The video processing system of claim 3, further comprising, means for time aligning image sources.

7. The video processing system of claim 3, further comprising, image processing means for updating image source alignment and image source color adjustment parameters.

8. A method to interactively synthesize at least one output view from at least one JPEG 2000 or Laplacian compressed image source comprising:
    a) image processing method for decoding and processing the at least one compressed image source to generate multi-resolution coefficients, said image processing method comprising:
        (i) Tier 2 decoding to parse and de-packetize the coded video;
        (ii) Tier 1 decoding to perform arithmetic decoding to extract quantized multi-resolution coefficients;
        (iii) de-quantization to remove any bias; and
        (iv) resolution normalization to create a common set of resolution bands across all image sources;
    b) a set of view synthesis parameters for each output view;

c) a View Control Manager to dynamically adjust view synthesis parameters based on view control requests; and d) at least one view synthesis pipeline for processing the multi-resolution coefficients to synthesize at least one view based on the corresponding view synthesis parameters.

9. The method of claim 8, wherein each view synthesis pipeline, further comprising:
   (i) module for selection of multi-resolution coefficients;
   (ii) a set of synthesis modules for warping, color adjustment and blending each resolution band; (iii) reassembly of the synthesized resolution bands; and
   (iv) either of encoding of synthesized resolution bands to generate compressed view or decoding of synthesized resolution bands to generate un-compressed view.

10. A video processing system comprising: a computer server and the computer readable medium containing instructions that, when executed by a processor, cause the processor to perform the method according to claim 8.

11. The video processing system of claim 10, further comprising: at least one compressed video source; means for receiving the compressed video; at least one interactive user device; means for transmitting synthesized views to at least one user device; and means for receiving view control messages from at least one interactive user device.

12. The video processing system of claim 11, further comprising: a media server with search and playback support.

13. The video processing system of claim 10, further comprising, image processing means for updating image source alignment and image source color adjustment parameters.

14. The video processing system of claim 10, further comprising, means for time aligning image sources.

15. The video processing system of claim 10, further comprising: a Data Source Selector to dynamically select one or more of input image sources, and a multi-port switch to dynamically select one or more view synthesis pipelines.

16. The video processing system of claim 10, further comprising: a data recorder with search and playback support.

17. A computer server for synthesizing at least one output view from at least one JPEG 2000 or Laplacian compressed image source, the system comprising:

a) image processing module for decoding and processing the at least one compressed image source to generate multi-resolution coefficients;

b) interfaces for specification of view synthesis parameters;

c) at least one view synthesis pipeline means for processing the multi-resolution coefficients to synthesize at least one view based on the corresponding view synthesis parameters;

d) interfaces for transferring at least one synthesized view to at least one user device; and e) a calibration update module to dynamically update image source alignment, and image source color adjustment parameters.

18. The computer server of claim 17, further comprising: a module for time aligning image sources.

19. A computer server for interactively synthesizing at least one JPEG 2000 or Laplacian output view from at least one compressed image source, the system comprising:

a) image processing module for decoding and processing the compressed image source to generate multi-resolution coefficients;

b) interfaces for receiving view control requests;

c) a View Control Manager means to dynamically adjust view synthesis parameters based on view control requests;

d) at least one view synthesis pipeline means for processing the multi-resolution coefficients to synthesize at least one view based on the corresponding view synthesis parameters;

e) interfaces for transferring at least one synthesized view to at least one user device; and f) a calibration update module to dynamically update image source alignment and image source color adjustment parameters.

20. The computer server of claim 19, further comprising: a module for time aligning image sources.

21. The computer server of claim 19, further comprising: data recorder with search and playback support.

22. The computer server of claim 19, further comprising, of Data Source Selector means to dynamically select one or more of input image sources, and a multi-port switch to dynamically select one or more view synthesis pipelines.

\* \* \* \* \*